United States Patent [19]
Kim

[11] Patent Number: 6,163,530
[45] Date of Patent: Dec. 19, 2000

[54] DATA MONITORING APPARATUS

[75] Inventor: Myoung-Whan Kim, Incheon, Rep. of Korea

[73] Assignee: Daewoo Telecom Ltd., Incheon, Rep. of Korea

[21] Appl. No.: 09/046,595

[22] Filed: Mar. 24, 1998

[30] Foreign Application Priority Data

Apr. 3, 1997 [KR] Rep. of Korea ...................... 97-12389

[51] Int. Cl.⁷ .................................................. G01R 31/08
[52] U.S. Cl. ........................................... 370/251; 370/247
[58] Field of Search ..................................... 370/225, 229, 370/230, 231, 232, 250, 251, 217, 244, 246, 247

[56] References Cited

U.S. PATENT DOCUMENTS

| | | | |
|---|---|---|---|
| 5,224,092 | 6/1993 | Brandt | 370/232 |
| 5,361,252 | 11/1994 | Sallberg et al. | 370/230 |
| 5,361,253 | 11/1994 | Feijen et al. | 370/252 |
| 5,940,409 | 8/1999 | Bergin | 370/523 |

*Primary Examiner*—Ajit Patel
*Assistant Examiner*—Bob A. Phunkulh
*Attorney, Agent, or Firm*—Bacon & Thomas, PLLC

[57] ABSTRACT

An apparatus for monitoring selected one of multiple channels comprises a counting unit for increasing a count value when an up mode is selected and for decreasing the count value when a down mode is selected, wherein the count value corresponds to a channel number of the multiple channels; a mode selecting unit for selecting one of the up and the down modes; a unit for inputting a channel number; a unit for generating a count value corresponding to the channel number from the inputting unit and a write-enable signal; a source selecting unit for selecting one of the count values from the counting unit and from the generating unit; a signal generating unit for generating a channel selecting signal corresponding to the count value; a converting unit for extracting data from a channel depicted by the channel selecting signal and converting transmission rate of the data; and an analyzing unit for monitoring the data from the converting unit to check whether or not the data is transferred properly.

6 Claims, 2 Drawing Sheets

DATA MONITORING APPARATUS

FIELD OF THE INVENTION

The present invention relates to an electronic switching system; and, more particularly, to a data monitoring apparatus capable of selecting and displaying a channel to be monitored.

BACKGROUND OF THE INVENTION

In an electronic switching system, digital data is generally multiplexed by using a time division multiplexing scheme. For example, an E1-type link of 2.048 Mbps includes 32 time slots, each time slot corresponding to a data channel. In order to monitor a particular channel, it is necessary to extract data transferred through the channel among the multiple channels.

Referring to FIG. 1, there is provided a block diagram of a conventional data monitoring apparatus 100 which comprises a keyboard 110, a CPU (central processing unit) 120, a channel signal generator 130, a rate converter 140 and a protocol processor 150. The data monitoring apparatus 100 is connected to a digital link L141 which transfers time division multiplexed data, e.g., an E1-type 2.048 Mbps link having 32 channels.

The multiplexed data is applied to the rate converter 140 of the data monitoring apparatus 100. At the rate converter 140, data transferred from a selected one of the 32 channels is extracted and its transmission rate is converted to a predetermined rate, e.g., 64 Kbps, at which the data is processed at the data analyzer 150. And the rate-converted data is applied to the data analyzer 150 which monitors the data. At the data analyzer 150, the applied data is analyzed to check whether or not data is transferred properly through the selected channel.

In the conventional monitoring apparatus, in order to select the channel to monitor, a channel information is applied to the CPU 120 via the keyboard 110 by using a channel input program, e.g., a pull-down menu program as well known. The CPU 120 outputs the channel information signal and a write-enable signal through the line L121 and L122 respectively to the channel signal generator 130. When receiving the channel information signal and the write-enable signal, the channel signal generator 130 applies a channel selection signal to the rate converter 140.

For example, numeral 5 is inputted at the keyboard by using the channel selection menu of the input program when the 5th channel of the 32 channels is to be monitored. Channel information of the numeral 5 is transferred to the CPU 120 where it is analyzed to generate a 5-bit channel information signal '00101' and to make the write-enable signal active. When the write-enable signal becomes active, the channel signal generator 130 receives the channel information signal from the CPU 120. The channel signal generator 130 generates a channel selection signal which retains high-state during the interval corresponding to the selected channel and low-state during the intervals corresponding to the remaining channels or vice versa. The rate converter 140 converts the transmission rate of the channel indicated by the channel selection signal to the 64 Kbps.

However, since the monitored channel should be selected by using the keyboard at the menu program, the channel monitoring procedure includes a complicated and time-consuming channel selection procedure. And, there is no element for displaying the selected channel visually in the conventional data monitoring apparatus.

SUMMARY OF THE INVENTION

It is a primary object of the present invention to provide a data monitoring apparatus capable of selecting a monitored channel among a plurality of channels easily and for displaying the selected channel visually.

In accordance with the present invention, there is provided an apparatus for monitoring selected one of multiple channels, comprising:

a counting unit for increasing a count value when an up mode is selected and for decreasing the count value when a down mode is selected, wherein the count value corresponds to a channel number of the multiple channels;

a mode selecting unit for selecting one of the up and the down modes;

a unit for inputting a channel number;

a unit for generating a count value corresponding to the channel number from the inputting unit and a write-enable signal;

a source selecting unit for selecting one of the count values from the counting unit and from the generating unit;

a signal generating unit for generating a channel selecting signal corresponding to the count value;

a converting unit for extracting data from a channel depicted by the channel selecting signal and converting transmission rate of the data; and an analyzing unit for monitoring the data from the converting unit to check whether or not the data is transferred properly.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
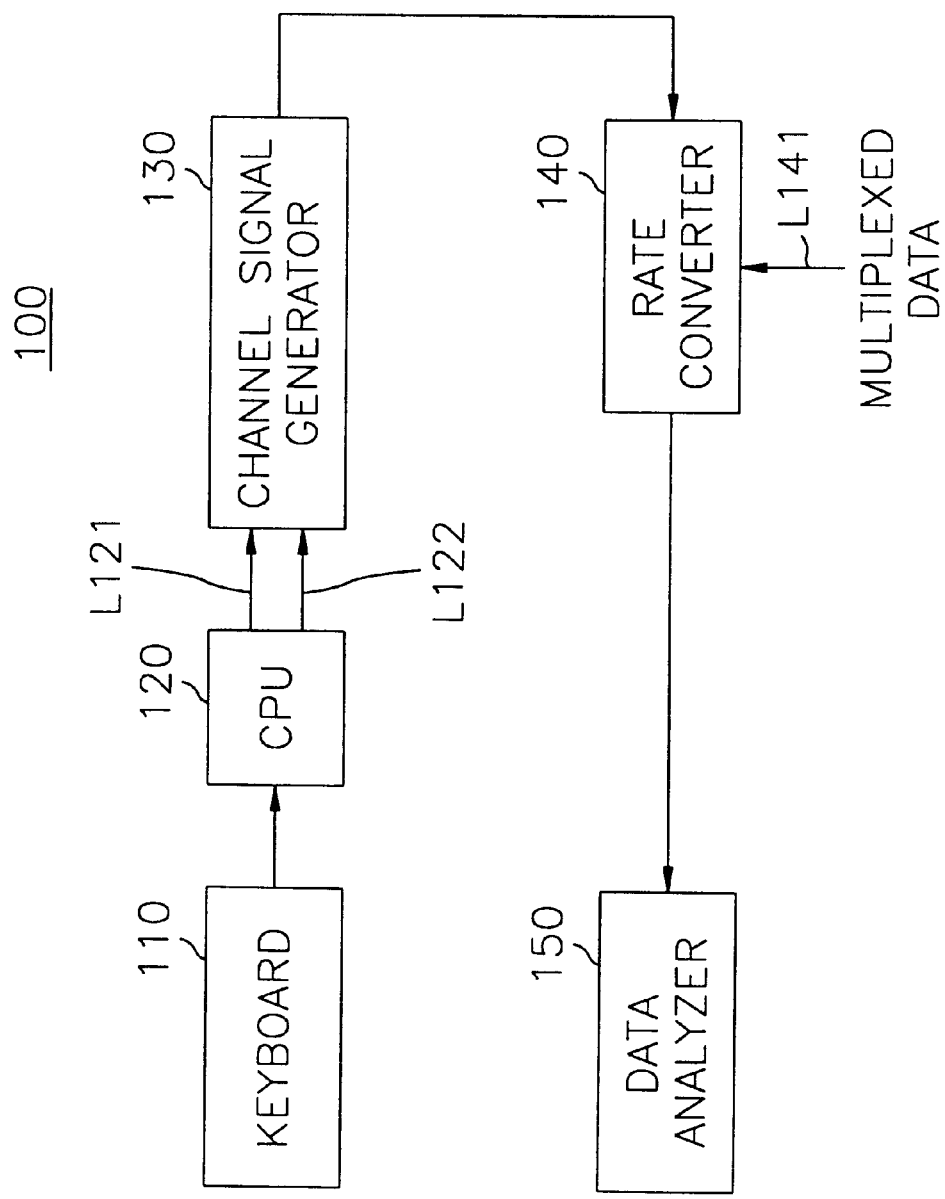
FIG. 1 presents a block diagram of a conventional data monitoring apparatus.
Figure 2:
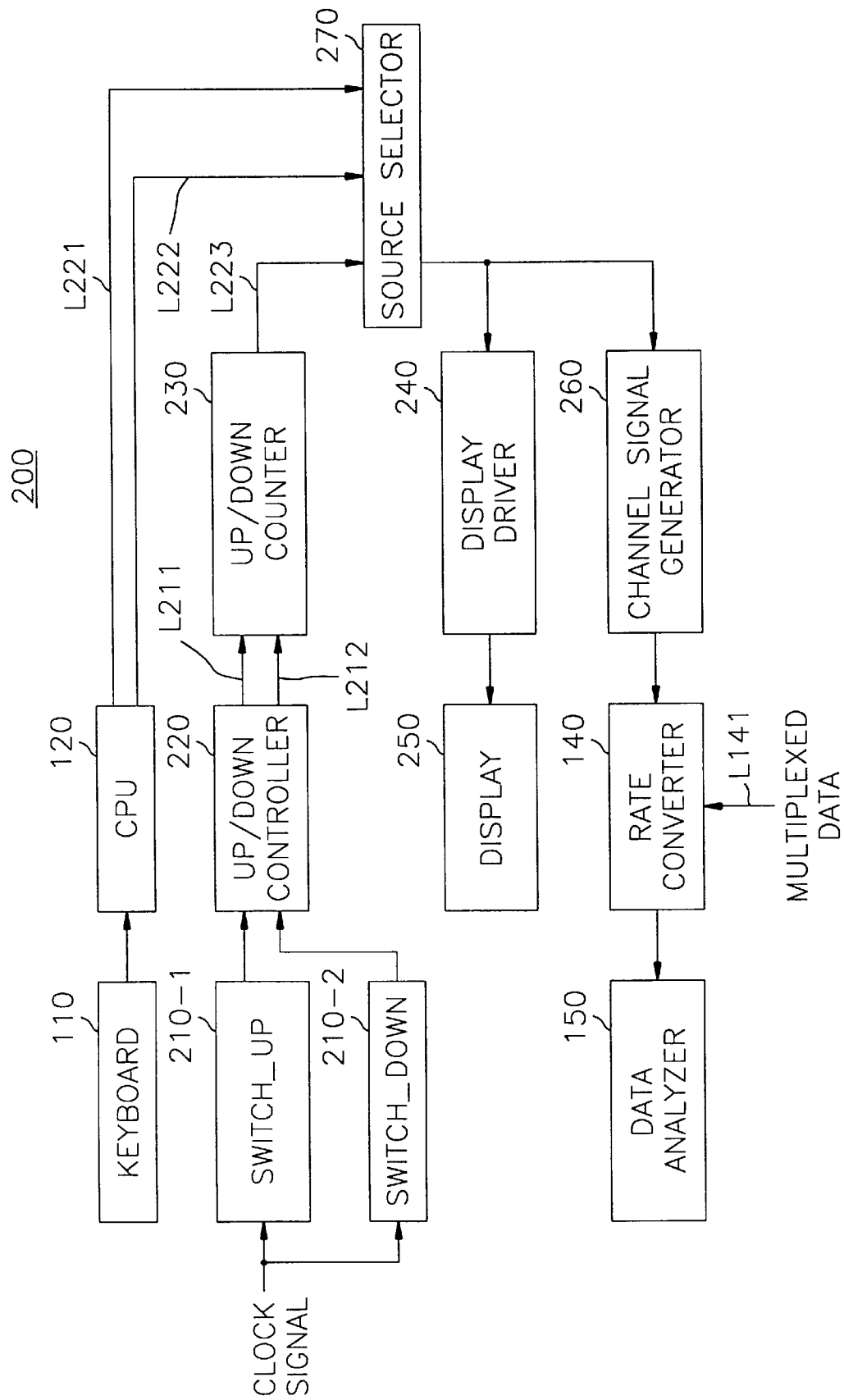
FIG. 2 provides a block diagram of a data monitoring apparatus in accordance with the present invention.

Referring to FIG. 2, there is provided a block diagram of an inventive data monitoring apparatus 200 which comprises a keyboard 110, a CPU (central processing unit) 120, a rate converter 140, a data analyzer 150, a switch_up 210-1, a switch_up 210-2, an up/down controller 220, an up/down counter 230, a display driver 240, a display 250, a channel signal generator 260 and a source selector 270.

A link transferring time division multiplexed data is connected to the rate converter 140 of the data monitoring apparatus 200. For the sake of illustration, it is assumed that the link is an E1-type 2.048 Mbps link having 32 channels.

An operator can select one of the channels by inputting a numeral corresponding to the channel at the keyboard 110. The CPU 120 analyzes the input from the keyboard to generate 5-bit channel information which is one of 5-bit binary numbers from '00000' to '11111' to depict one of 32 channels and a write-enable signal.

And also, the operator can select one of the channels by pushing the switch_up button 210-1 or the switch_down button 210-2. The up/down controller 220 controls an up/down mode of the up/down counter 230. The up/down counter 230 increases a count value when an up mode is selected and decreases the count value when a down mode is selected as is well known. The count value of the up/down counter 230 is the channel information signal, one of the 5-bit binary numbers from '00000' to '11111' to depict one of 32 channels.

The source selector 270 selects one of the channel information signals from the CPU 120 and the up/down counter 230 as an output thereof.

The display driver 240 drives the display 250. The display 250 indicates the selected channel. The display 250 can be implemented by 2-digit 7-segment or by 32 LED's (light emitting diodes), n-th LED corresponding to n-th channel where the n is an integer between 0 to 31.

The channel signal generator 260 generates a channel selection signal which becomes active state during the interval corresponding to the selected channel.

The rate converter 140 extracts the data transferred from a selected channel of the multiple channels and converts transmission rate of the selected channels to a predetermined rate, e.g., 64 Kbps, at which the data is processed at the data analyzer 150.

The data analyzer 150 monitors the data from the rate converter 140 to check whether or not the data is transferred properly through the selected channel.

Hereinafter, the operation of the data monitoring apparatus 200 will be described.

The 2.048 Mbps data of the 32 channels is applied to the rate converter 140 of the data monitoring apparatus 200.

The clock signal of a predetermined frequency, e.g., 2 Hz, is applied to the up/down controller 220 via one of the switch_up button 210-1 and the switch_down button 210-2 while one of the switch_up button 210-1 and the switch_down button 210-2 is pushed.

The up/down controller 220 applies the 2 Hz clock signal through a line L211 to the up/down counter 230. And the up/down controller 220 makes a mode selection signal up mode state when the 2 Hz clock signal is received from the switch_up button 210-1 or down state when the 2 Hz clock signal is received from the switch_down button 210-2. The mode selection signal is inputted to the up/down counter 230 through a line L212. The mode selection signal represents high logic state while the switch_up button 210-1 is pushed and low logic state while the switch_up button 210-2 is pushed.

The up/down counter 230 increases or decreases the 5-bit count value to depict the selected channel. For example, the count value is increased to '00011' when the current count value is '11111' and the 2 Hz clock signal and the mode selection signal of high logic state is inputted to the up/down counter 230 for 2 seconds.

In other words, while the 2 Hz clock signal and the mode selection of high state are inputted to the up/down counter 230, the up/down counter 230 increases the count value at every half second. On the other hand, while the 2 Hz clock signal and the mode selection of low state are inputted to the up/down counter 230, the up/down counter 230 decreases the count value at every half second. And when the pushed button is released, the final count value does not change.

On the other hand, if the numeral corresponding to the selected channel is inputted at the keyboard 110, the 5-bit channel information depicting the selected channel and a CPU write-enable signal are generated at the CPU 120. And the 5-bit channel information and the CPU write-enable signal are provided to the source selector 270 through the lines L221 and L222, respectively.

The source selector 270 is coupled with both of the CPU 120 and the up/down counter 230. The source selector 270 selects one of the 5-bit signal from the CPU 120 through the line L221 and from the up/down counter 230 through the line L223 according to the CPU write-enable signal. In other words, the channel information of the CPU 120 is loaded to the source selector 270 if the CPU write-enable signal is in active state; and if otherwise, the count value of the up/down counter 230 is loaded to the source selector 270. And the source selector 270 provides the loaded information to the display driver 240 and the channel signal generator 260.

The display driver 240 analyzes the 5-bit information from the source selector 270 to control the display 250 to indicate the selected channel. For example, in case the selected channel is fifth channel, the display driver 240 controls the 7-segment to present numeral 5 when the display 250 is implemented by the 2-digit 7-segment or controls fifth LED to be turned on when the display 250 is implemented by 32 LED's.

And also, the output of the source selector 270 is provided to the channel signal generator 260. At the channel signal generator 260, a channel selection signal is generated. For example, the channel selection signal becomes low logic state for the selected channel and remains in high logic state for the remaining channels.

The rate converter 140 is coupled with the channel signal generator 260 for extracting the data from the channel depicted by the channel selection signal. At the rate converter 140, the transmission rate of the extracted data is converted to the 64 Kbps. And the rate-converted data is applied to the data analyzer 150 which monitors the data.

At the data analyzer 150, the applied data is analyzed to check whether or not the data is transferred properly through the selected channel.

As described above, the apparatus of the present invention allows the operator to select and vary the channel to be monitored more easily. And also, the monitored channel is indicated visually.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus for monitoring one of multiple channels, comprising:

counting means for increasing a first count value when an up mode is selected and for decreasing the count value when a down mode is selected, wherein the count value corresponds to a channel number of the multiple channels;

mode selecting means for selecting one of the up and the down modes;

means for inputting a channel number;

means for generating a second count value corresponding to the channel number from the inputting means and a write-enable signal;

source selecting means for selecting one of the count values from the counting means and from the generating means;

signal generating means for generating a channel selecting signal corresponding to the selected count value;

converting means for extracting data from a channel depicted by the channel selecting signal and converting transmission rate of the data; and analyzing means for monitoring the data from the converting means to check whether or not the data is transferred properly.

2. The apparatus of claim 1, further comprising:

displaying means for indicating the first count value of the counting means; and driving means for controlling the displaying means.

3. The apparatus of claim 2, wherein the displaying means includes 2 digit 7-segment for displaying the decimal number of the first count value.

4. The apparatus of claim 2, wherein the displaying means includes multiple number of LED's, an LED being assigned to each of the multiple channels and turned on when said each of the multiple channels is selected.

5. The apparatus of claim 1, wherein the mode selecting means includes two push-buttons, one assigned for the up mode and the other assigned for the down mode, wherein a clock signal of a predetermined frequency is applied to each of the two push-buttons.

6. The apparatus of claim 5, wherein the predetermined frequency is 2 Hz.

* * * * *